Oct. 17, 1967 Y. M. HOAG 3,347,483

MAGNETIC TAPE MECHANISM

Filed June 23, 1965

INVENTOR:
YATES M. HOAG

BY Norman C. Fulmer
HIS ATTORNEY.

United States Patent Office 3,347,483

Patented Oct. 17, 1967

3,347,483

MAGNETIC TAPE MECHANISM

Yates M. Hoag, Utica, N.Y., assignor to General Electric Company, a corporation of New York Filed June 23, 1965, Ser. No. 466,152
2 Claims. (Cl. 242—55.12)

Figure 1:
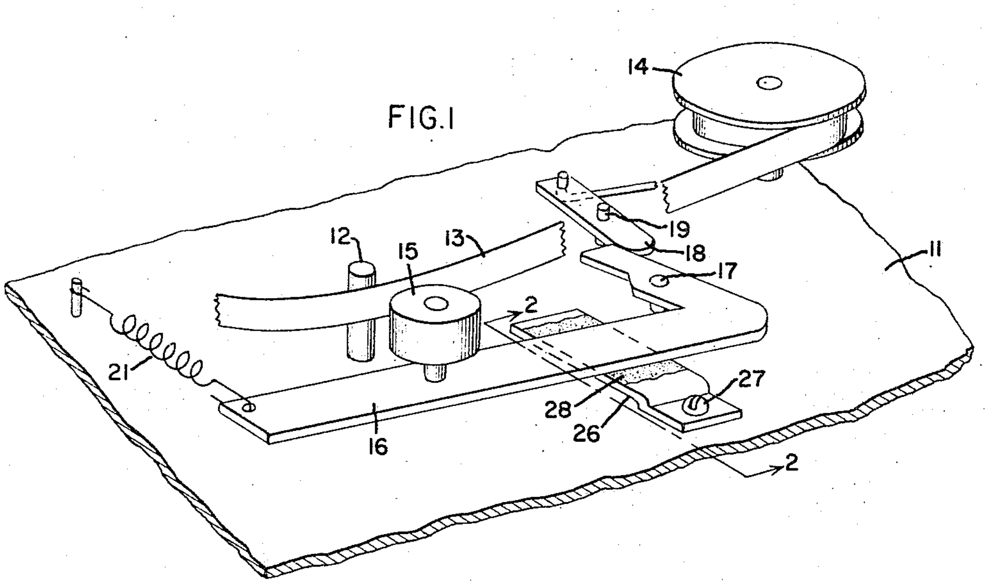

This invention relates to magnetic tape recording and playback mechanisms, and particularly to such mechanisms of the type having a capstan drive for the tape.

In capstan drive tape mechanisms, the magnetic tape passes between a rotating capstan drive shaft and a pinch wheel when recording and also when playing back a recording. The pinch wheel resiliently urges the tape against the rotating capstan so that the tape is driven at constant speed across the various recording, playback, and erase heads. By this action, the tape is pulled off a supply reel. At the same time, the tape is wound up on a tap-up reel which is rotated by a slippage mechanism so that the take-up reel provides tension on the tape and winds the tape as it is driven past the capstan. During certain functions of the tape recorder, such as rewinding the tape onto the supply reel, and in the stop or off condition, the pinch wheel is positioned away from the capstan so that the capstan will not drive the tape, or so that the tape can be inserted or removed.

When the mechanism is set, usually by means of push-button or lever arrangements, to the record or playback condition, simultaneously the take-up reel begins to rotate and the pinch wheel moves to "pinch" the tape against the rotating capstan. The capstan, if not already rotating, reaches operating speed very quickly; however, the take-up reel tends to require a short time to come up to speed due to inertia and also due to the slippage in its drive mechanism. This inertia is greater when there is some tape wound on the take-up reel. The capstan therefore tends to drive the tape before the tap-up reel has come up to sufficient speed to wind the tape as fast as the capstan moves it. This undesirably tends to cause the tape to "whip" and "spill"—i.e., to become loose and to accumulate and bunch up in the space between the capstan and the take-up reel, during the time required for the take-up reel to come up to speed. Then, the take-up reel reaches adaquate speed and takes up the slack in the tape. This jerks the tape, tending to cause it to break, and also tending to cause the loose tape to catch over the edge of one of the flanges of the take-up reel, whereupon the tape can become caught, tangled, mangled, and broken.

This problem can be solved in the more expensive tape mechanisms by employing a separate motor for the take-up reel, by using timing devices to insure proper timing of the tape-drive and take-up reel drive, or by employing a "floating" idler pulley arrangement for taking up slack in the tape. These solutions to the problem are relatively expensive and require additional space, and hence are not suitable for use in small and inexpensive tape mechanisms.

An object of the invention is to provide an improved tape mechanism.

Another object is to provide an economical, reliable, and compact arrangement for preventing tape from spilling in a capstan-drive tape recorder mechanism.

Further objects will be apparent from the following description and claims, and from the accompanying drawing.

The capstan drive tape mechanism of the invention comprises, briefly and in a preferred embodiment, a pinch wheel carried by an arm adapted to move the pinch wheel toward the capstan, and a member is arranged to resiliently engage against a side of the pinch wheel arm so that the pinch wheel arm slides thereagainst; a coating of viscous fluid is provided between the resilent member and the pinch wheel arm. The viscosity of the fluid and the area of contact between the resilient member and the pinch wheel arm are chosen so as to slow down the motion of the pinch wheel toward the capstan, to delay driving of the tape until the take-up reel has come up to suitable speed for preventing slack in the tape when driven by the capstan. This solves the above-described problem of tape spilling, in a reliable, economical, and compact manner.

Figure 2:
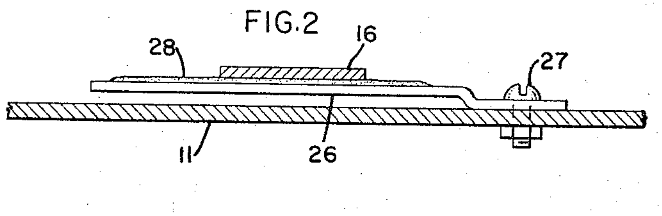

In the drawing:

FIG. 1 is a perspective view of a preferred magnetic tape drive mechanism in accordance with a preferred embodiment of the invention, and FIG. 2 is a view partially in section looking in the direction of the arrows 2—2 of FIG. 1.

A base plate 11, which may be made of metal, plastic, or other suitable material, is provided for carrying the various parts of the mechanism. A tape-driving capstan 12 extends upwardly from the base plate 11, and is caused to rotate by suitable means such as an electric motor (not shown). A magnetic recording tape 13 extends past the capstan 12, as shown, and is wound around a supply reel (not shown) to the left of the portion of tape shown, and is wound around a take-up reel 14 to the right, in conventional manner. Recording and playback heads, and an erase head, are normally located immediately to the left of the capstan 12, so that the tape 13 moves over and against the heads. These heads and the supply reel are conventional and are not shown in the drawing for the sake of clarity in illustrating the invention.

A pinch wheel 15 is mounted on a pinch wheel arm 16 which is pivotally mounted at 17 to the base plate 11. An actuating lever 18 is pivotally mounted to the base plate 11 at 19 and is so located that when the end thereof engages the rear end of the pinch wheel arm 16, as shown in FIG. 1, it causes the pinch wheel arm 16 to pivot about the pivot 17 so as to move the pinch wheel 15 way from the capstan 12. A spring 21, of tension type, is connected between the forward end of the pinch wheel arm 16 and the base plate 11, as shown, so as to urge the arm and its pinch wheel 15 toward the capstan 12. The pinch wheel 15 is arranged to rotate freely about its axis, so that when the actuating lever 18 is moved out of contact with the pinch wheel arm 16, thereby allowing the spring 21 to move the arm so that the pinch wheel 15 moves toward the capstan 12 and engages against the tape 13, thereby pinching the tape 13 between the capstan 12 and pinch wheel 15, the rotating capstan 12 will drive the tape in a direction toward the right in the drawing.

The tape recorder actuating mechanism, which may be of conventional push-button or lever arrangement, and is not shown in the drawing, is arranged to start the take-up reel 14 rotating when the pinch wheel 15 is moved toward the tape 13. The take-up reel is rotated by means of a conventional slippage arrangement, which may comprise a belt drive or clutch arrangement, so that the take-up reel tends to rotate slightly faster than required to wind up the moving tape at all times, so as to apply some tension to the tape between the capstan 12 and the take-up reel. However, since some time is required for the take-up reel to reach suitable operating speed, there will be a brief time during which the capstan 12 drives the tape, but the tape is not being taken up on the take-up reel, so that the tape becomes loose and tends to bunch up and accumulate in the space at the right of the capstan 12. Subsequently the take-up reel reaches speed and applies tension to the tape 13 with a jerk. This not only tends to break the tape, but there also is a likelihood of the tape spilling and becoming tangled over and around an edge of the reel 14.

The above-described mechanism and functioning thereof is conventional and well-known.

In accordance with the present invention, a member 26 of resilient material such as phosphor bronze, is attached to the base plate 11 such as by means of a screw 27, and this member is shaped so as to resiliently ride against a side of the pinch wheel arm 16, as shown. A coating 28 of viscous fluid is provided between the resilient member 26 and the pinch wheel arm 16. Preferably, this fluid is initially coated on the surface of the resilient member 26. A suitable viscous fluid is known by the registered trademark "Viscasil," made by the General Electric Company, Silicone Products Department, Waterford, N.Y. This material is a dimethyl silicone fluid. A suitable viscosity is about 60,000 or 100,000 centistoke viscosity at 25° C. This silicone fluid has the properties of maintaining its viscosity, and of adhering in place, over a wide range of temperature. The viscosity and area of the fluid coating 28 are so chosen as to slow down movement of the pinch wheel arm 16 by the spring 21 by an amount so as to delay contacting of the pinch wheel 15 against the tape 13 until the take-up reel 14 has had time to come up to speed so as to immediately take up slack in the tape 13 upon the tape being driven by the capstan 12 when the pinch wheel 15 comes in contact therewith. A suitable area for the viscous fluid is about three-fourths of a square inch. A suitable time-delay for achieving this objective, is approximately one second. The resiliency and pressure of the member 26 against the pinch wheel arm 16 has some effect on the amount of delay, though the main purpose of this resiliency is to maintain the fluid coating 28 in contact with both the member 26 and arm 16.

It has been found that the invention solves the problem of tape spillage in a reliable and economical manner, and with a simple arrangement which is convenient to apply to certain existing tape recorder mechanisms as well as for manufacturing into tape mechanisms, and which requires relatively little space. Thus, the invention achieves its objectives.

While a preferred embodiment of the invention has been shown and described, various other embodiments and modifications thereof will be apparent to those skilled in the art, and will fall within the scope of invention as defined in the following claims.

What I claim is:

1. In a tape mechanism having a capstan for driving a tape, a pinch wheel carried by an arm adapted to move the pinch wheel toward said capstan and against the tape to urge the tape against the capstan so as to be driven thereby, a take-up reel for the tape and means to rotate the take-up reel so as to wind the tape thereon after passing said capstan, there being a period of time required for said take-up reel to acquire operating speed after the mechanism is actuated, the improvement comprising a member in engagement against a side of said pinch-wheel arm so that said arm slides thereagainst when moving the pinch wheel toward said capstan, and a layer of viscous fluid between and in contact with said member and said arm, thereby to slow down the movement of said pinch wheel toward said capstan and delay driving of said tape by the capstan until said take-up reel substantially acquires said operating speed.

2. In a tape mechanism having a capstan for driving a tape, a pinch wheel carried by a flat elongated arm, said arm being pivotally mounted at a point spaced from said pinch wheel and arranged so that the arm can swing toward said capstan to bring said pinch wheel against the tape to urge the tape against the capstan so as to be driven thereby, means resiliently urging said arm toward said capstan, means for selectively forcing said arm away from said capstan, a take-up reel for the tape and means to rotate the take-up reel so as to wind the tape thereon after passing said capstan, there being a period of time required for said take-up reel to acquire operating speed after the mechanism is actuated, the improvement comprising a flat member in resilient engagement with a flat side of said pinch-wheel arm at a location spaced from said pivotal mounting of the arm, and a layer of viscous fluid between and in contact with said member and said arm, thereby to slow down movement of said pinch wheel toward said capstan and delay driving of said tape by the capstan until said take-up reel substantially acquires said operating speed.

References Cited

UNITED STATES PATENTS

| | | | |
|---|---|---|---|
| 3,001,733 | 9/1961 | Axon et al. | 242—55.12 |
| 3,164,331 | 1/1965 | Hardy | 242—55.12 |

LEONARD D. CHRISTIAN, *Primary Examiner.*